ADOLPH GRINKE, OF ST. LOUIS, MISSOURI.

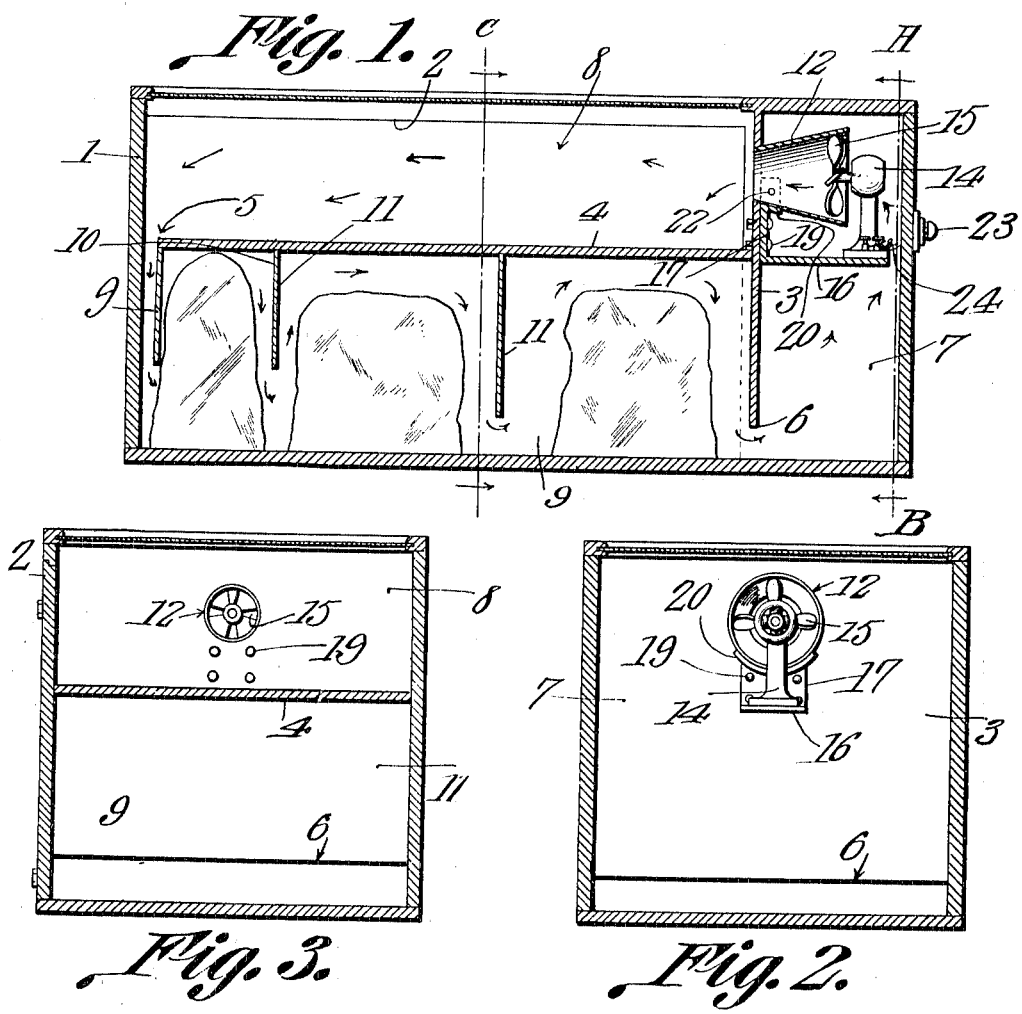
A. GRINKE.
ICE BOX.
APPLICATION FILED JUNE 15, 1910.
986,917. Patented Mar. 14, 1911.
Adolph Grinke, Inventor
by C. A. Snow & Co.
Attorneys

UNITED STATES PATENT OFFICE.

ICE-BOX.

986,917.

Specification of Letters Patent. Patented Mar. 14, 1911.

Application filed June 15, 1910. Serial No. 567,080.

*To all whom it may concern:*

Be it known that I, ADOLPH GRINKE, a citizen of the United States, residing at St. Louis, in the State of Missouri, have invented a new and useful Ice-Box, of which the following is a specification.

The device forming the subject matter of this application is an ice box of the type commonly placed upon counters and the like, to contain merchandise which is to be dispensed.

It is the object of this invention to provide a receptacle of this character, the interior of which is so arranged that a continuous circulation of air may be effected; and to provide novel means for effecting such circulation.

In the drawings,—Figure 1 is a vertical longitudinal section; Fig. 2 is a transverse section upon the line A—B of Fig. 1; Fig. 3 is a transverse section upon the line C—D of Fig. 1; and Fig. 4 is a fragmental perspective of the bracket whereby the funnel and the fan are upheld.

The receptacle 1 may be of any desired form; in the present instance it is shown as being rectangular in outline, and provided with a suitable door 2. A partition 3 extends entirely across the receptacle, transversely, adjacent one end of the receptacle, the partition, however, being terminated short of the bottom of the receptacle, as shown at 6. Fixed to and projecting at right angles from the partition 3 is another partition or platform 4, hereinafter referred to as the platform. This platform 4 extends entirely across the receptacle 1 transversely of the same. At one end, however, the platform 4 is terminated short of one end wall of the receptacle 1, as seen at 5. The partition 3 serves to define an air shaft 7 in one end of the receptacle, while the platform 4 serves to define a storage compartment 8 in the upper portion of the receptacle, and an ice compartment 9 in the lower portion thereof. Depending from the free end of the platform 4 is a baffle plate 10. that portion of the partition 3 which is disposed below the platform 4, likewise serving as a baffle plate. Between the two baffle plates thus formed, one or more intermediate baffle plates 11 may be secured to the platform 4, to depend from the same.

There is an opening in the partition 3, located above the platform 4, and serving as a communication between the storage compartment 8 and the air shaft 7. If desired, one end of a funnel shaped tube 12, may be inserted into this opening, the larger end of the funnel shaped tube being disposed in the air shaft 7. A fan is provided, the pedestal of which is denoted by the numeral 14, and the blades by the numeral 15. The pedestal 14 of the fan may be supported in the air shaft 7 in any desired manner; the blades 15 preferably being disposed within the contour of the funnel shaped tube 12, in order that the air may be forced from the air shaft 7 directly into the storage compartment 8, without causing a down draft in the air shaft.

The fan may be mounted in any desired manner. If desired an angle bracket may be provided, upon the horizontal arm 16 of which, the pedestal 14 of the fan may be placed. The vertical arm 17 of the angle bracket may be provided with openings 18 adapted to receive bolts 19, or like securing elements, whereby the angle bracket may be secured to the partition 3. Secured to, and preferably formed integrally with the vertical arm of the angle bracket, is an arcuate collar 20. This collar 20 may be provided with openings 21, adapted to receive bolts 22 or the like, whereby the funnel shaped tube 12 may be held in place upon the bracket. The fan is preferably electrically driven. Upon one end wall of the receptacle 1, or elsewhere, a socket 23 may be mounted, the socket carrying wires 24, adapted for connection with the pedestal 14 of the fan.

In practical operation, the merchandise is placed within the storage compartment 8, to rest upon the platform 4. The ice compartment 9 is filled, and the fan is put into motion. It will be seen that the cold air will be drawn from the ice compartment 9 into the air shaft 7, passing beneath the lower edge of the partition 3. The blades 15 of the fan will serve to draw this cold air into the funnel shaped tube 12, and to drive the air into the storage compartment 8. The air, at low temperature, will thus pass over the contents of the storage compartment 8, and enter the ice compartment 9, to be cooled again. Owing to the presence of the baffle plates 10 and 11, a proper circulation of air about the blocks of ice will be secured, the air ultimately being drawn from the fan beneath the lower end of the partition 3, and at the coolest portion of the receptacle.

By the foregoing operation, the contents of the storage compartment will be maintained at a low temperature. A continuous current of air, cooled to a low temperature in the ice compartment 9, will at all times be kept flowing over whatever may be placed within the storage compartment 8.

Having thus described the invention, what is claimed is:—

In a device of the class described, a receptacle having a depending partition secured to its top but spaced from its bottom, and defining an air shaft at one end of the receptacle; a platform projecting from the intermediate portion of the partition and terminating short of one end wall of the receptacle, to define a storage compartment adjacent the top of the receptacle and an ice compartment adjacent the bottom of the receptacle; baffle plates depending from the platform into the ice compartment; a bracket located in the air shaft and consisting of a vertical arm and a horizontal arm, the vertical arm being secured to the partition and being provided at its upper end with an arcuate collar; a funnel secured to the collar and extending through the partition to form a communication between the air shaft and the ice compartment; a fan structure supported on the horizontal arm of the bracket and having blades located in the end of the fan; a socket secured to the receptacle; and electric conductors between the socket and the fan structure.

In testimony that I claim the foregoing as my own, I have hereto affixed my signature in the presence of two witnesses.

ADOLPH GRINKE.

Witnesses:
 PAULINE GRINKE,
 WILLIAM P. ARND.